United States Patent [19]

Bauer et al.

[11] Patent Number: 5,257,603

[45] Date of Patent: Nov. 2, 1993

[54] COATED PISTON AND PROCESS FOR APPLYING COATING

[75] Inventors: Manfred Bauer, Ludwigsburg; Manfred Ziegler, Stuttgart, both of Fed. Rep. of Germany

[73] Assignee: Mahle GmbH, Stuttgart, Fed. Rep. of Germany

[21] Appl. No.: 958,270

[22] Filed: Oct. 8, 1992

[30] Foreign Application Priority Data

Oct. 10, 1991 [DE] Fed. Rep. of Germany ....... 4133546

[51] Int. Cl.[5] .......................... B23P 15/10; F22B 5/00
[52] U.S. Cl. .................................. 123/193.6; 92/223; 29/888.048
[58] Field of Search ............... 123/193.6; 92/222, 223; 29/888.04, 888.048; 427/355, 388.1, 385.5

[56] References Cited

U.S. PATENT DOCUMENTS

| | | | |
|---|---|---|---|
| 4,270,348 | 6/1981 | Winberg | 427/388.1 |
| 4,316,384 | 2/1982 | Ueda et al. | |
| 4,440,069 | 4/1984 | Holtzberg et al. | 123/193.6 |
| 4,528,004 | 7/1985 | Makino et al. | 427/385.5 |
| 4,562,100 | 12/1985 | Fryd et al. | 427/385.5 |
| 4,656,711 | 4/1987 | Yagi et al. | 427/355 |
| 4,759,958 | 7/1988 | Numata et al. | 427/385.5 |
| 4,831,977 | 5/1989 | Presswood | 123/193.6 |
| 4,898,905 | 2/1990 | Kawakami et al. | |

FOREIGN PATENT DOCUMENTS

| | | |
|---|---|---|
| 112848 | 5/1986 | European Pat. Off. |
| 1694940 | 8/1971 | Fed. Rep. of Germany |
| 2206400 | 8/1973 | Fed. Rep. of Germany |
| 2630949 | 1/1977 | Fed. Rep. of Germany |
| 2914987 | 10/1980 | Fed. Rep. of Germany |
| 2947025 | 6/1981 | Fed. Rep. of Germany |
| 3236853 | 4/1984 | Fed. Rep. of Germany |
| 3605919 | 8/1986 | Fed. Rep. of Germany |
| 3905287 | 8/1990 | Fed. Rep. of Germany |
| 3939704 | 6/1991 | Fed. Rep. of Germany |

OTHER PUBLICATIONS

Patent Abstracts of Japan, Oct. 11, 1980, vol. 4, No. 144.
Patent Abstracts of Japan, Dec. 4, 1984, vol. 8, No. 263.

*Primary Examiner*—Tony M. Argenbright
*Assistant Examiner*—M. Macy
*Attorney, Agent, or Firm*—Collard & Roe

[57] ABSTRACT

A coated piston and a process for applying same to a piston of an internal combustion engine having a cylinder. The piston and cylinder are made primarily from a lightweight metal. Graphite bonded in cured resin is applied to the piston and forms a durable running layer.

12 Claims, No Drawings

COATED PISTON AND PROCESS FOR APPLYING COATING

BACKGROUND OF THE INVENTION

1. Field of the Invention

The present invention relates to a graphite coated piston and a process for applying the coating to the piston.

2. The Prior Art

Internal combustion engines are known which have a piston and a cylinder made from a lightweight metal, for example, aluminum. However, the surface of the piston must be coated with another metal to form a running layer because it is not possible to pair a lightweight metal piston with a lightweight metal cylinder. More particularly, it is not possible to have an aluminum piston operate in an aluminum cylinder. This coating is usually galvanized and made from iron, nickel or chromium.

The galvanized layers have a drawback in that they are damaging to the environment and costly to manufacture.

SUMMARY OF THE INVENTION

It is therefore an object of the present invention to provide a coated piston and a process for applying the coating according to the invention which overcomes the drawbacks of the prior art, and provides a running layer of graphite bonded in cured resin.

It is a further object of the present invention to provide a running layer which can be simply and efficiently applied to the piston.

These and other related objects are achieved according to the invention by a coated piston and a process for applying the coating, in which the piston and the cylinder are made primarily from a lightweight metal. The coating consists of graphite bonded in cured resin applied to the piston and forming a durable running layer. Preferably, the lightweight material of the piston and cylinder is aluminum.

The durable running layer has a thickness in the range of 10 to 25 $\mu$m. The graphite includes graphite particles having a size in the range of 1 to 10 $\mu$m, preferably 1 to 5 $\mu$m. The graphite bonded in cured resin includes 30% to 60% graphite by weight, preferably 40% to 60% by weight. The graphite bonded in cured resin includes a binding agent consisting of a thermosetting resin such as a curable polyimide. The graphite bonded in cured resin is applied to the piston for a duration of 10 to 30 minutes at a temperature in the range of 150° C. to 210° C. The material applied includes an organic solvent, such as a nonpolar solvent, for example, N-methyl-pyrrolidone (NMP).

The process for applying a coating to a piston includes the steps of providing a piston and cylinder made primarily of lightweight metal and applying a coating of graphite bonded in cured resin to the piston to form a durable running layer. The piston and cylinder are made primarily of aluminum. The coating has a thickness in the range of 10 to 25 $\mu$m. The coating includes graphite particles having a size in the range of 1 to 10 $\mu$m, preferably 1 to 5 $\mu$m. The coating of graphite bonded in cured resin includes 30% to 60% graphite by weight, preferably 40% to 60% graphite by weight. The coating of graphite bonded in cured resin includes a binding agent consisting of a thermosetting resin such as a curable polyimide. The coating is applied for a duration of 10 to 30 minutes at a temperature in the range of 150° C. to 210° C. The coating is ideally applied by screen printing. The material applied includes an organic solvent such as a nonpolar solvent, for example, N-methyl-pyrrolidone (NMP).

Surprisingly, it was discovered that with the running layer according to the invention, it is possible to achieve running times which are equal to or better than running times achieved with other known coatings. In addition, the graphite layer can be applied very simply and efficiently, i.e., without waste. Preferably, the graphite layer is applied to the piston by a screen printing process, as is known for the application of graphite layers.

DETAILED DESCRIPTION OF PREFERRED EMBODIMENT

In a preferred embodiment of the invention, the skirt of an aluminum piston is coated with graphite bonded in a curable thermosetting resin, such as a curable polyimide, i.e. Resistherm AJ-55 (trademark of Bayer-Company), as the binding agent. The graphite is applied in a 20 $\mu$m thick layer with a screen printing process. The material applied in the screen printing process may consist of about 50 percent by weight solvent, 20 percent by weight graphite, and 30 percent by weight binding agent. The solvent is an organic solvent such as a nonpolar solvent, for example, N-methyl-pyrrolidone (NMP). The particle size of the graphite bonded in the layer is between 1 and 10 $\mu$m.

The layer is applied in a screen printing process and is then cured for approximately 15 minutes at 210° c. In addition to the skirt of the piston, the piston groove lands and/or the top land can be wholly or partially coated with the material described above. The cured layer includes about 40 percent by weight graphite and about 60 percent by weight binding agent.

While only a single embodiment of the present invention has been shown and described, it is to be understood that many changes and modifications may be made thereunto without departing from the spirit and scope of the invention as defined in the appended claims.

What is claimed is:

1. A coated piston of an internal combustion engine having a cylinder, the piston and cylinder being made of aluminum comprising:
   graphite particles bonded in cured resin applied to said piston and forming a durable running layer having a thickness in the range of 10–25 $\mu$m, said graphite particles having a size in the range of 1 to 5 $\mu$m and said graphite particles bonded in cured resin consisting of 30 percent to 60 percent graphite by weight.

2. The coated piston as claimed in claim 1, wherein said graphite bonded in cured resin consists of 40 percent to 60 percent graphite by weight.

3. The coated piston as claimed in claim 2, wherein said graphite bonded in cured resin includes a binding agent consisting of curable thermosetting resin.

4. The coated piston as claimed in claim 3, wherein said curable thermosetting resin consists of curable polyimide.

5. A process for applying a coating to a piston of an internal combustion engine having a cylinder, comprising the steps of
   providing a piston and cylinder made of aluminum metal; and applying a coating of graphite bonded in cured resin to the piston to form a durable running layer having a thickness in the range of 10 to 25 μm, said coating including graphite particles, said graphite particles having a size in the range of 1 to 5 μm.

6. The process as claimed in claim 5, wherein said step of applying a coating includes applying a coating of graphite bonded in cured resin consisting of 30 percent to 60 percent graphite by weight.

7. The process as claimed in claim 6, wherein said step of applying a coating includes applying a coating of graphite bonded in cured resin consisting of 40 percent to 60 percent graphite by weight.

8. The process as claimed in claim 7, wherein said step of applying a coating includes applying a coating of graphite bonded in cured resin including a binding agent consisting of curable thermosetting resin.

9. The process as claimed in claim 8, wherein said step of applying a coating includes applying a coating of graphite bonded in cured resin including a binding agent consisting of curable polyimide.

10. The process as claimed in claim 9, wherein said step of applying a coating includes applying a coating of graphite bonded in cured resin for a duration of 10 to 30 minutes in a temperature in the range of 150° C. to 210° C.

11. The process as claimed in claim 10, wherein said step of applying a coating includes applying a coating of graphite bonded in cured resin by screen printing.

12. A coated piston of an internal combustion engine having a cylinder, the piston and cylinder being made of aluminum, comprising:
graphite bonded in cured resin applied to said piston and forming a permanent durable running layer having a thickness in the range of 10 to 25 μm, wherein said graphite consists of graphite particles having a size in a range of 1 to 5 μm, said graphite bonded in cured resin consisting of at least 30 percent by weight.

* * * * *